(12) United States Patent
Enders et al.

(10) Patent No.: US 11,526,011 B2
(45) Date of Patent: Dec. 13, 2022

(54) DISPLAY SYSTEM OF A VEHICLE FOR DISPLAYING A VIRTUAL IMAGE AND METHOD FOR DISPLAYING THE VIRTUAL IMAGE FOR THE VEHICLE

(71) Applicant: Bayerische Motoren Werke Aktiengesellschaft, Munich (DE)

(72) Inventors: Martin Enders, Deisenhofen (DE); Jasper Stern, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 47 days.

(21) Appl. No.: 17/207,934

(22) Filed: Mar. 22, 2021

(65) Prior Publication Data

US 2021/0294097 A1 Sep. 23, 2021

(30) Foreign Application Priority Data

Mar. 23, 2020 (DE) ...................... 10 2020 107 859.5

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/12* (2013.01);
(Continued)

(58) Field of Classification Search
CPC ... G02B 27/01–0189; G02B 2027/0105–0198; B60K 2370/334; G03B 21/00–64
See application file for complete search history.

(56) References Cited

U.S. PATENT DOCUMENTS 3,620,592 A 11/1971 Freeman
2010/0014053 A1* 1/2010 Brentnall, III ......... G03B 21/00
353/7

(Continued)

FOREIGN PATENT DOCUMENTS

DE 11 2015 000 806 T5 12/2016
DE 10 2015 012 626 A1 4/2017
JP 2016-194555 A 11/2016

OTHER PUBLICATIONS

German language Office Action issued in German Application No. 10 2020 107 859.5 dated Nov. 12, 2020 (eight (8) pages).

*Primary Examiner* — Christopher A Lamb, II
(74) *Attorney, Agent, or Firm* — Crowell & Moring LLP

(57) ABSTRACT

A display system of a vehicle displays a virtual image. The display system has a projection device, which is configured to emit display light in order to generate an image, and a reflecting device, which is configured for a first reflection of display light of the projection device arranged above the reflecting device by way of the reflecting device attached in or on an instrument panel of the vehicle. The display light of the projection device incident on the reflecting device is substantially retroreflected. The display system further includes a windshield of the vehicle, which windshield is configured for a second reflection of at least part of the display light, which was reflected by the reflecting device, to the eyes of an observer in the vehicle in order to allow the observer to see, behind the windshield, the virtual image of the image generated by the projection device.

14 Claims, 4 Drawing Sheets

(51) Int. Cl.
*G02B 5/12* (2006.01)
*G02B 27/00* (2006.01)
(52) U.S. Cl.
CPC .. *G02B 27/0093* (2013.01); *B60K 2370/1529* (2019.05); *B60K 2370/21* (2019.05); *B60K 2370/23* (2019.05); *B60K 2370/31* (2019.05); *B60K 2370/77* (2019.05); *G02B 2027/0138* (2013.01)

(56) References Cited

U.S. PATENT DOCUMENTS

| | | | |
|---|---|---|---|
| 2010/0195201 A1 | 8/2010 | Minoura et al. | |
| 2016/0320617 A1* | 11/2016 | Matsushita | G02B 27/01 |
| 2017/0059872 A1* | 3/2017 | Banyay | G02B 27/0179 |
| 2019/0204596 A1* | 7/2019 | Shi | G02B 3/08 |
| 2020/0033614 A1 | 1/2020 | Shi | |

\* cited by examiner

DISPLAY SYSTEM OF A VEHICLE FOR DISPLAYING A VIRTUAL IMAGE AND METHOD FOR DISPLAYING THE VIRTUAL IMAGE FOR THE VEHICLE

CROSS REFERENCE TO RELATED APPLICATION

This application claims priority under 35 U.S.C. § 119 from German Patent Application No. 10 2020 107 859.5, filed Mar. 23, 2020, the entire disclosure of which is herein expressly incorporated by reference.

BACKGROUND AND SUMMARY OF THE INVENTION

The disclosure relates to a display system of a vehicle for displaying a virtual image. Moreover, the disclosure relates to a method for displaying the virtual image for the vehicle.

Based on development activities of virtual display systems in a vehicle, a number of problems requiring a solution are known. As a rule, displays within the vehicle serve to display driving-relevant information such as information relating to navigation, range, speed, etc., but are increasingly also used to display entertainment information, also referred to as entertaining, for example videos, cover arts, etc. Display systems can be subdivided into direct displays such as LC (liquid crystal) displays, OLED (organic light emitting diode) displays and into so-called HUD displays (head-up display, also known as a display system in which the user can maintain their head posture or direction of view to read the display because the information is projected into their visual field), which generate virtual images by way of mirror reflections. To have full screen virtual images over a large part or the entire region of a windshield there are developments in which a display device with a large display area is installed horizontally on an instrument panel/dashboard of the vehicle, wherein the display area can then be considered to be the large part or the entire region of the windshield by way of the mirroring reflection of the windshield. Below, the terms "display" and "display device" are used synonymously.

The approach with the large display is accompanied by various problems. Firstly, the costs of the displays themselves and of the integration thereof in the vehicle are high. In addition to which the display system that extends over the instrument panel has a significant weight, leading to a reduction in the drive performance and an increase in the power requirements of the vehicle. Secondly, the display system does not specify a unique emission direction in relation to the occupants of the vehicle. The display system illuminating large parts of the windshield or the entire area thereof may, under certain circumstances, be visible not only to a vehicle driver but also to their front seat passenger and/or to occupants in the back seat, even if this is not intended. Finally, a further disadvantage arising in the case of a display area extending over the instrument panel or a large part thereof is that of high susceptibility to stray light as a result of sunlight, which, having been reflected in the display area, can reach the eye of the vehicle driver or of other occupants in the vehicle and therefore dazzle them.

It is an object of the present invention to provide a display system for a vehicle for displaying a virtual image and a method for displaying the virtual image for the vehicle, which avoid the disadvantages of the prior art. In particular, the display of the virtual image should be embodied in such a way that the display system can be integrated in cost-effective fashion and adding little weight into the vehicle. In addition to a simple assembly/integration into the vehicle, there should additionally be a low susceptibility to stray light as a result of sunlight and a unique emission direction in relation to an occupant in the vehicle.

This object is achieved by the subject matter of the independent claims. Advantageous configurations of the invention are specified in the dependent claims.

The display system according to the invention of a vehicle for displaying a virtual image comprises a projection device, which is configured to emit display light in order to generate an image, and a reflecting device, which is configured for a first reflection of display light of the projection device arranged above the reflecting device by way of the reflecting device attached in or on an instrument panel of the vehicle, wherein the display light of the projection device incident on the reflecting device is substantially retroreflected. The display system further comprises a windshield of the vehicle, which windshield is configured for a second reflection of at least part of the display light, which was reflected by the reflecting device, to the eyes of an observer in the vehicle in order thus to allow the observer to see, behind the windshield, the virtual image of the image generated by the projection device.

By way of example, the observer is a vehicle driver or a front seat passenger. Instead of a display device arranged in or on the instrument panel, the reflecting device is, according to the invention, attached in or on the instrument panel of the vehicle, with display light of the projection device incident on the reflecting device being substantially retroreflected.

In the case of retroreflection, catadioptric elements, i.e., mirroring and refracting elements, reverse the incident display light and transmit it back in a reversed direction in relation to a direction of the incident display light. Retroreflection is reflection in which the incident display light is radiated back to the projection device in tightly bundled fashion. This type of reflection is achieved with the help of a large number of very small catadioptric parts, e.g., half-mirrored glass spheres or mirrored prisms. Retroreflective substances are referred to as reflection substances. These include, for example, reflecting films, reflecting fabrics and reflecting colors. The retroreflective value R' denotes the degree of the retroreflective behavior of an object, a retroreflective value R' (cd/lx·m$^2$) related to an area of 1 m$^2$. The retroreflective value is significantly dependent on the illumination angle and the observation angle. The retroreflective value decreases with increasing illumination angle, i.e., an angle between a normal vector of a reflecting surface of the reflecting device and the partial beam of the projection device incident on this surface. The degree of reduction is different for different retroreflective materials, and so a distinction is made between wide-angle products, which admit a high degree of angling between the normal vector and the light source and the partial beam incident on the surface and acute angled products, which develop their retroreflective properties only in the case of small illumination angles. The retroreflective value decreases with increasing observation angles, i.e., an angle between the partial beam incident on the surface of the reflecting device and the partial beam reflected by the reflecting device. In the application of retroreflective materials in accordance with the present invention, the assumption is made that the observation angle always remains relatively small, i.e., between zero and 20 degrees.

Thus, the reflecting device is a substantially retroreflective device. Substantially retroreflective means that a partial beam of the display light of the projection device incident on the reflecting device is not reflected back onto itself in ideal fashion, i.e., ideally retroreflected, but there is a deviation between an incident and a reflected partial beam, in such a way that an angle between optical axes of the incident and reflected partial beam is not equal to zero degrees, for example 20 degrees, 10 degrees or 5 degrees, and/or there is a distance not equal to zero, which possibly varies with height above the reflecting device, between the optical axes of the incident and reflected partial beam. Deviations of this type emerge, firstly, from a distance, present as a matter of principle, between the optical axes of the incident and reflected partial beams if the incident partial beam does not pass through a center of the sphere in the case of a retroreflective sphere or is not incident on a center of the prism in the case of a retroreflective prism. Secondly, the deviation from the ideal retroreflection already emerges purely from unavoidable manufacturing tolerances in the case of the reflecting device. In this respect, all commercially available retroreflective layers/surfaces are merely substantially retroreflective, i.e., not ideally retroreflective, on account of the imaging tolerances thereof.

For the imaging application in the display system according to the invention, it is possible to set the surface density of the retroreflective bodies in the form of spheres and/or prisms and the retroreflective property in form of a retroreflective value. Since the observer, e.g., the vehicle driver, cannot always adopt the same eye position in the vehicle, a variable observation angle in relation to the virtual image, projected behind the windshield, of the image generated by the projection device is advantageous. An ideal retroreflector would only supply the observer with a virtual image if the light source in the form of the projection device were situated in the eye of the observer. However, in the case of retroreflectors for road traffic/road surroundings, these are designed such that a headlamp of the vehicle and an eye of the observer have a distance, e.g., approximately 50 cm and the observation angle when driving past a traffic sign provided with a retroreflective film likewise changes. Reflection films suitable in principle are available commercially as diamond grade on the basis of spheres and also prisms.

The projection device can be arranged in a simple and cost-effective manner above the reflecting device, for example within an interior of the vehicle and on or in a headrest of a seat, for example of a driver seat, of the vehicle or outside of the interior and in or on the roof of the vehicle. The reflecting device can likewise be attached in simple and cost-effective fashion, for example as a retroreflective film, in or on the instrument panel. In this way, the display system according to the invention can be integrated in the vehicle in cost-effective fashion and adding little weight. In addition to the simple assembly/integration into the vehicle, there moreover is a low susceptibility to stray light as a result of sunlight because sunlight incident on the reflecting device is substantially retroreflected, i.e., reflected in the direction of the windshield such that the vehicle driver or a front seat passenger is not dazzled, or only dazzled a little, by sunlight reflected by the reflecting device. As a result of the substantially retroreflected display light, the display region of the virtual image is specified by an aperture, i.e., a clear opening or a diameter thereof of the projection device, through which aperture the light rays are emitted, and so a clear emission direction or at least a clear emission direction angle range arises in relation to only one occupant in the vehicle, for example the vehicle driver.

Display light of the projection device can be incident on the reflecting device, which is embodied as a reflecting film for example, in the manner perpendicular from above, said reflecting device having been attached on the instrument panel/dashboard, wherein the substantially retroreflected light component is reflected in the windshield and hence mirrored into the occupant's eye. Displays are no longer required in or on the instrument panel and the substantially retroreflective reflecting film removes the sunlight effect. The information contained in the display light in the form of the virtual image is only visible to an observer in the beam path of the display system. Use can likewise be made of a shutter film, i.e., a film with a sealing function for at least part of the area of the film. Moreover, high values of luminance can be generated by the retroreflection; these are advantageous particularly in the case of bright light outside of the vehicle.

The term vehicle comprises automobiles, trucks, buses, motorhomes, motorbikes, etc., which serve to transport persons, goods, etc. In particular, the term comprises motor vehicles for transporting persons. In addition or as an alternative thereto, the hybrid or electric vehicle can be a pure electric vehicle (BEV) or a plug-in hybrid vehicle (PHEV) according to embodiments. However, other forms of drive can also be used, for example in the form of a diesel or gasoline-operated vehicle. The vehicle can also be present in the form of a vehicle on rails. A bicycle with an internal power source also represents a vehicle within the meaning of the invention.

Advantageously, the projection device is arranged relative to a substantially plane reflecting surface of the reflecting device in such a way that the display light of the projection device incident on the reflecting surface is incident on the reflecting surface in a manner substantially parallel to the normal vector of the reflecting surface. In this way, a high and/or maximum retroreflective value of the reflecting surface is achieved.

If the projection device arranged above the reflecting device is arranged on the vehicle outside of an interior of the vehicle for the observer and beyond the windshield of the vehicle, in particular on or in the roof of the vehicle or on an outer side of the windshield, use can be made of a multiplicity of reflecting devices, even those with low or very low imaging tolerances, for the display system. As a result, a large number of available reflecting devices are rendered usable, which has an advantageous effect on the costs for the reflecting device. Moreover, a relative position of the reflecting device in the vehicle can be selected more flexibly than would be the case if the projection device is situated in the interior of the vehicle outside of a visual field of the observer. Finally, the projection device arranged outside of the interior of the vehicle, which might be installed on or in the roof of the vehicle with protection from the elements, does not take up valuable installation space in the interior.

Preferably, an optical axis of the projection device extends substantially parallel to the normal vector of the substantially plane surface of the reflecting device, in particular vertically. This allows optimal use of the imaging properties of the reflecting device, leading to high or maximum quality of the virtual imaging. Other angles greater than zero degrees between the optical axis of the projection device and the normal vector of the substantially plane surface of the reflecting device are also possible.

In another embodiment of the invention, a partial beam of the display light reflected by the reflecting device has, up to an angle of no more than 20 degrees, preferably 15 degrees, particularly preferably 10 degrees, with respect to a partial beam of the display light of the projection device incident on the reflecting device, an intensity which allows the observer to see, behind the windshield, the virtual image of the image generated by the projection device. In the case of such a retroreflective reflecting device, the projection device can be situated in the interior of the vehicle and outside of the visual field of the observer. Therefore, it is preferable if the projection device—arranged above the reflecting device—is arranged in the interior of the vehicle and substantially level with the eyes of the observer, in particular on or in either a headrest or an upper part of a seat of the vehicle. This minimizes a reflection angle deviating from the ideal retroreflection in order to supply the virtual image to the observer. By way of example, the projection device can be arranged immediately next to the head of the observer and level with their eyes in a manner aligned with the windshield.

Preferably, the reflecting device is formed from a substantially retroreflective film, in particular a 3M high gain retroreflective film. This allows the reflecting device to be provided in cost-effective fashion with a high imaging quality and a high retroreflective value.

It is advantageous if a camera arranged in or on the instrument panel of the vehicle and/or on the windshield of the vehicle is aligned with the observer or the windshield in such a way that a position of the eyes of the observer can be determined by the camera during the operation of the camera. A closed-loop control unit is present, which is configured to interact with a camera and the projection device that when there is a change in the position of the eyes of the observer the image generated by the projection device is altered in terms of its position relative to the eyes of the observer by a horizontal and/or vertical rotation of the projection device or of an actuator in the projection device. This allows the observer to see, behind the windshield, the virtual image of the image generated by the projection device when the position of their eyes has changed. Thus, there is closed-loop control, in which the projection device is rotated in horizontal and/or vertical fashion on the basis of the position of the eyes of the observer in order to alter the position of the virtual image in such a way that the virtual image remains in the visual field of the observer. Hence, the observer can continue to observe the virtual image, even in the case of cornering or head movements.

The invention also comprises a method for displaying a virtual image for a vehicle. The method comprises a first reflection of display light of a projection device arranged above a reflecting device by the reflecting device attached in or on an instrument panel of the vehicle, wherein the display light of the projection device incident on the reflecting device is substantially retroreflected, and a second reflection of at least some of the display light reflected by the reflecting device by a windshield of the vehicle to the eyes of an observer in the vehicle in order thus to allow the observer to see, behind the windshield, the virtual image of an image generated by the projection device. The method according to the invention has advantages and effects corresponding to the system according to the invention.

Advantageously, the display light of the projection device incident on the reflecting device is substantially retroreflected in such a way that the virtual image is visible to the observer when the projection device is arranged outside of a visual field of the observer in an interior of the vehicle. This may be the case if a partial beam of the display light reflected by the reflecting device has, up to an angle of no more than 20 degrees, preferably 15 degrees, particularly preferably 10 degrees, with respect to a partial beam of the display light of the projection device incident on the reflecting device, an intensity which allows the observer to see, behind the windshield, the virtual image of the image generated by the projection device.

Other objects, advantages and novel features of the present invention will become apparent from the following detailed description of one or more preferred embodiments when considered in conjunction with the accompanying drawings.

BRIEF DESCRIPTION OF THE DRAWINGS

Providing nothing else is specified, the same reference signs are used below for the same elements and elements with the same effect.

DETAILED DESCRIPTION OF THE DRAWINGS

Figure 1:
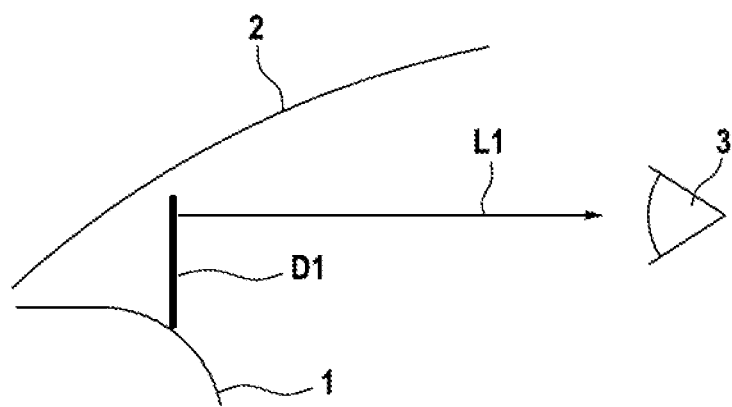
FIG. 1 is a schematic side view of a display system of a vehicle with a direct display in accordance with the prior art.

FIG. 1 shows a schematic side view of a display system with a display D1, which emits display light directly into an eye of an observer 3 by way of a partial beam L1. Below, the reference sign 3 always refers to an observer, for example a vehicle driver, their front seat passenger or an occupant in the back of the vehicle, with the observer 3 being represented by their eye in FIG. 1 and the subsequent figures. The display device or the display D1 is arranged on an instrument panel/dashboard 1. From a display film, the display D1 can generate the partial beam L1 in such a way that the display D1 has a semitransparent embodiment and only slightly impairs the observer's 3 visual field. There is no role for a windshield 2 of the vehicle in this display system in accordance with the prior art. Semitransparent displays, in particular, are complicated and expensive to produce, with an impairment of the visual field of the observer 3 often being present, at least on account of the frame of the display D1.

Figure 2:
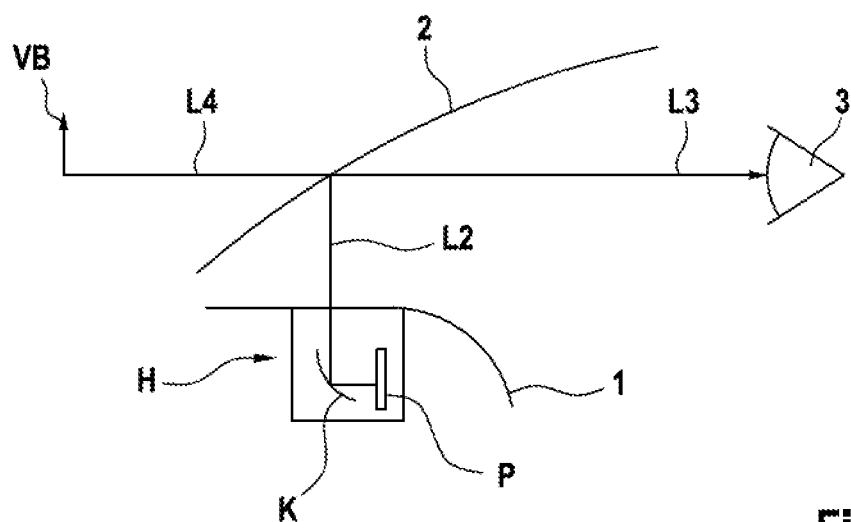
FIG. 2 is a schematic side view of a display system of a vehicle with a head-up display for displaying a virtual image, wherein the head-up display occupies part of an instrument panel on a driver side of the vehicle, in accordance with the prior art.

FIG. 2 shows a schematic side view of a display system of a vehicle with a head-up display H for displaying a virtual image VB, which the observer 3 perceives behind the windshield 2. The head-up display H comprises a light source in the form of a panel P, which guides display light to a concave mirror K that reflects a partial beam L2 of the display light to the windshield 2. Following a further reflection at the windshield 2, the display light of the head-up display H impinges on the eye of the observer 3 in a partial beam L3, said observer being able to see the virtual image of the head-up display H as a result, as illustrated by the partial beam L4. The head-up display H as a display device is only installed into the instrument panel 1 on a driver side of the vehicle which is why only a restricted region appears for the virtual image for the observer 3. Nevertheless, this display system in accordance with the prior art is complicated and expensive because the optics required for the head-up display H need to be integrated in and adapted to the installation space in the instrument panel 1. Such a display system is not able to be retrofitted.

Figure 3A:
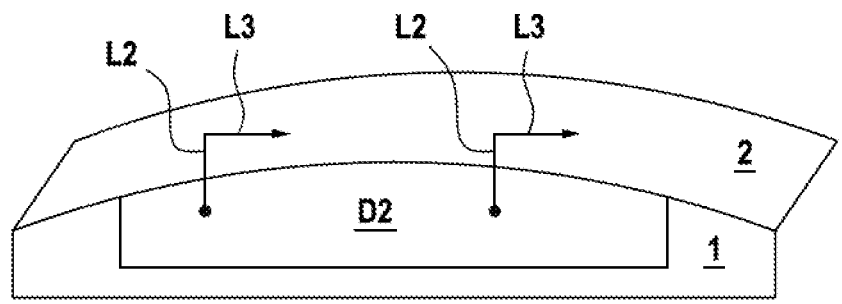
FIGS. 3a, 3b show a schematic three-dimensional visualization with a plan view (FIG. 3a) and a side view (FIG. 3b) of a display system of a vehicle with a head-up display for displaying a virtual image, wherein the head-up display of the display system occupies a large part of an instrument panel on a driver and front seat passenger side of the vehicle, in accordance with the prior art.

FIG. 3a illustrates a schematic three-dimensional visualization with a plan view of a further display system in accordance with the prior art, which comprises a head-up display D2 for displaying the virtual image VB. In contrast to the display system in accordance with the prior art illustrated in FIG. 2, the head-up display D2 of the display system is embodied over a large part of the instrument panel 1 on the driver side and a front seat passenger side of the vehicle. As a result, there is an increased imaging region for the virtual image VB for the observer 3 in relation to the region of the virtual image VB in FIG. 2. Consequently, the display light of the head-up display D2 installed in the instrument panel 1 can reach the eyes of the observer 3 via a multiplicity of partial beams L2 directed at the windshield 2 and partial beams L3 reflected at the latter; this leads to a correspondingly large region of the virtual image VB, which extends over a large part of the windshield 2 on the driver and front seat passenger side. The head-up display D2 is even more complicated, and hence more expensive, than the head-up display H because the display light of the head-up display D2 is emitted over a larger region in terms of area than is the case in the head-up display H.

Figure 3B:
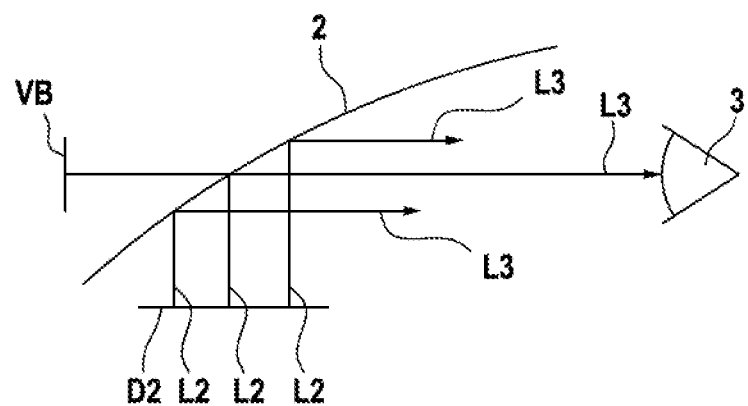

FIG. 3b illustrates the display system in accordance with the prior art, illustrated in FIG. 3a, in a side view. The display light emitted by the head-up display D2 is emitted toward the windshield 2 as partial beams L2 and, following the reflection, mirrored into the eyes of an observer 3 as partial beams L3. As a result, the observer 3 can identify, behind the windshield 2 and in their visual field, a virtual image VB of the image of the head-up display D2. A disadvantage of the display system in accordance with the prior art in FIGS. 2, 3a and 3b is that, in particular, sunlight can be reflected/scattered into the eyes of the observer 3 at a surface of the head-up display H or D2. This leads to an impairment in the view of the observer 3 as a result of a dazzling effect of the sunlight.

Figure 4:
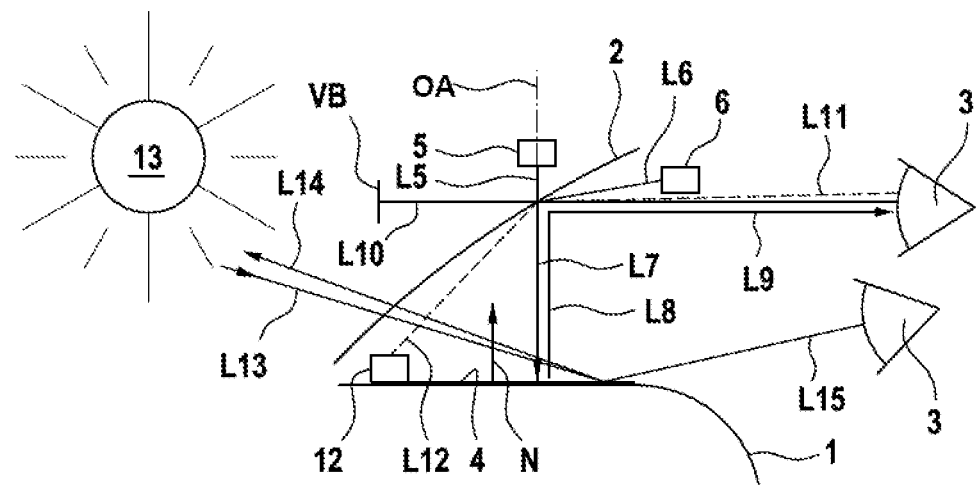
FIG. 4 is a schematic side view of a display system according to an embodiment of the invention of a vehicle for displaying a virtual image.

FIG. 4 shows a schematic side view of the display system according to an embodiment of the invention of a vehicle for displaying the virtual image VB. The display system comprises a projection device 5 outside of an interior of the vehicle, said projection device being configured to emit display light in a partial beam L5 in order to generate an image. A reflecting device 4 is configured for a first reflection of display light with a partial beam L7, which corresponds to the partial beam L5 outside of the interior of the vehicle following the passage through the windshield 2 in the direction of the reflecting device 4 in the interior. The reflecting device 4 is configured for the first reflection of the display light in the form of the partial beam L7 of the projection device 5 arranged above the reflecting device by way of the reflecting device 4 attached to the instrument panel 1 of the vehicle. The display light incident on the reflecting device 4, in the form of the partial beam L7 of the projection device 5, is substantially retroreflected into the partial beam L8.

The windshield 2 of the vehicle is configured for a second reflection of at least some of the display light reflected by the reflecting device 4, in the form of the partial beam L8, to the eyes of the observer 3 in the vehicle in order thus to allow the observer 3 to see, behind the windshield 2, the virtual image VB of the image generated by the projection device 5. To this end, the partial beam L9 reflected at the windshield 2 impinges on the eyes of the observer 3, who can thereby identify the virtual image VB behind the windshield 2 in accordance with the partial beam L10. The display light emitted by the projection device 5 outside of the interior of the vehicle is thus guided outside of the interior in the partial beam L5 and through the windshield 2 to the reflecting device 4 in the interior of the vehicle through the partial beam L7, and it is retroreflected into the partial beam L8, which impinges on the eyes of the observer 3 after the reflection at the windshield 2 as partial beam L9, said observer being able to identify, behind the windshield 2, a virtual image VB of the display light of the projection device 5 on account of the partial beam L10. An optical axis OA of the projection device 5 arranged outside of the interior can be parallel to a normal vector N of a surface of the reflecting device 4 in such a way that the partial beam L5 emitted by the projection device 5 is incident in substantially perpendicular fashion on the reflecting surface of the reflecting device 4 after passing through the windshield 2. In this way, a substantially retroreflective property of the reflecting device 4 can be used efficiently and with a high retroreflective value. The projection device 5 can be arranged on or in the roof of the vehicle or on an outer side of the windshield 2, as a result of which no installation space in the interior of the vehicle is occupied.

In a further embodiment of the invention, the projection device 6 is arranged in the interior of the vehicle and outside of a visual field of the observer 3, approximately level with the eyes of the observer 3 and aligned in the direction of the windshield 2. The nature of a reflecting surface of the reflecting device 4 is such that the partial beam L8 of the display light reflected by the reflecting device 4 has, up to an angle of no more than 20 degrees, preferably 15 degrees, particularly preferably 10 degrees, with respect to the partial beam L7 of the display light of the projection device 6 incident on the reflecting device 4, an intensity which allows the observer 3 to identify, behind the windshield 2, the virtual image VB of the image generated by the projection device 6. The reference signs of the partial beams L7, L8 and the reference signs L7a-L7d and L8a-L8d listed in the following figures denote the display light emitted in these partial beams in addition to the partial beams. On account of always relevant imaging tolerances, the retroreflective property of the surface of the reflecting device 4 is not ideal but its nature is such that an angle of up to 20 degrees, preferably 15 degrees and particularly preferably 10 degrees is present between the partial beam L8 reflected by the reflecting device 4 and the partial beam L7 incident on the reflecting device 4. In the case of such an angle between the partial beams L7 and L8, it is possible, according to the invention, to arrange the projection device 6 arranged in the interior of the vehicle to be outside of the visual field of the observer 3, for example in a headrest or an upper region of a seat of the observer, for example the vehicle driver or a front seat passenger. An intensity of the reflected partial beam L8 which is possibly reduced in relation to a given intensity of an arrangement of the projection device 6 in the visual field of the observer 3 is accepted, with the projection device 6 and the reflecting device 4 being able to be designed in such a way that there is a sufficient intensity of the partial beam L9 impinging on the eyes of the observer 3 for the purposes of identifying the virtual image.

To identify the virtual image VB, the angle between the reflected partial beam L8 and the partial beam L7 incident on the reflecting device should not be greater than 20 degrees, preferably 15 degrees and particularly preferably 10 degrees, in order to prevent an unwanted reflection of a partial beam L13 of light from the sun 13, which could otherwise reach the eye of the observer 3 as reflected partial beam L15. Instead, according to the invention, the sunlight of the partial beam L13 incident on the reflecting device 4 is substantially retroreflected as partial beam L14 and guided through the windshield 2 to a region outside of the interior of the vehicle. The angle for identifying the virtual image, between the partial beam L7 incident on the reflecting device 4 and the partial beam L8 reflected thereby, can be provided between the partial beams L6 of the display light emerging from the projection device 6 and the partial beam L9 impinging on the eye of the observer 3 in order to ensure a sufficient intensity for identifying the virtual image for the observer 3.

In a further embodiment of the invention a camera 12 arranged in the instrument panel 1 of the vehicle or, as illustrated in FIG. 4, thereon can be aligned with the observer 3 or, as illustrated in FIG. 4, with the windshield 2 in such a way that a position of the eyes of the observer 3 can be determined by the camera during the operation of the camera. A closed-loop control unit is present, which interacts with the camera 12 and the projection device 5 or 6 in such a way that when there is a change in the position of the eyes of the observer the image generated by the projection device 5 or 6 is altered in terms of its position relative to the eyes of the observer 3 by a horizontal and/or vertical rotation of the projection device 5 or 6 or of an actuator in the projection device 5 or 6 in order to allow the observer 3 to see, behind the windshield 2, the virtual image VB of the image generated by the projection device 5 or 6 when the position of their eyes has changed. In FIG. 4, a partial beam L11 reflected or scattered by the eyes of the observer 3 is reflected by the windshield 2 in the direction of the camera 12 as partial beam L12 in such a way that the partial beam L12 reflected at the windshield 2 impinges on the camera 12 in order to be able to determine the position of the eyes of the observer 3.

Figure 5:
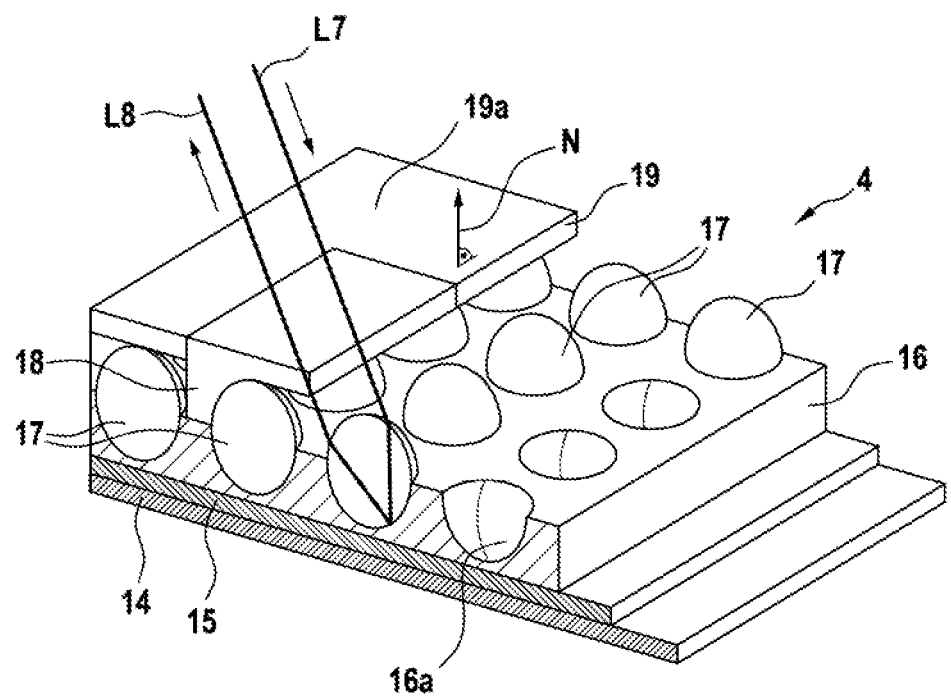
FIG. 5 shows a schematic three-dimensional visualization with a cross section and a plan view of a reflecting device of the display system according to an embodiment of the invention.

FIG. 5 illustrates a schematic three-dimensional visualization with a cross section and plan view of the reflecting device 4 of the exemplary display system according to the invention. The reflecting device 4 can be present in the form of a substantially retroreflective film with an adhesive layer 14, which is applied to a substrate layer 15 on which, in turn, an embedding layer 16 has been applied for the purposes of embedding and arranging reflecting spheres 17. To this end, the embedding layer 16 has cutouts with a reflecting layer 16a, with the reflecting spheres 17 being accommodated in the cutouts, said spheres being arranged in relation to one another for example in a checkerboard pattern as illustrated in FIG. 5 or in a diamond shape for an arrangement that is as close as possible. In the direction of the normal vector N, a substantially transparent layer 18 is arranged on the reflecting spheres 17, said transparent layer either forming part of the substantially transparent surface layer 19 or having arranged thereon the surface layer 19 as a further layer. A partial beam L7 incident on the retroreflective film 4 and entering the reflecting spheres 17 is refracted at a surface of the reflecting sphere into the interior of the reflecting spheres 17, is reflected at the reflecting layer 16a in the cutouts of the embedding layer 16, refracted to the outside at an inner surface of the reflecting sphere 17 and guided as a beam L8, which has been retroreflected in relation to the beam L7 incident on the reflection film 4, from a surface 19a of the reflection film 4 in the direction of the windshield 2.

Figure 6A:
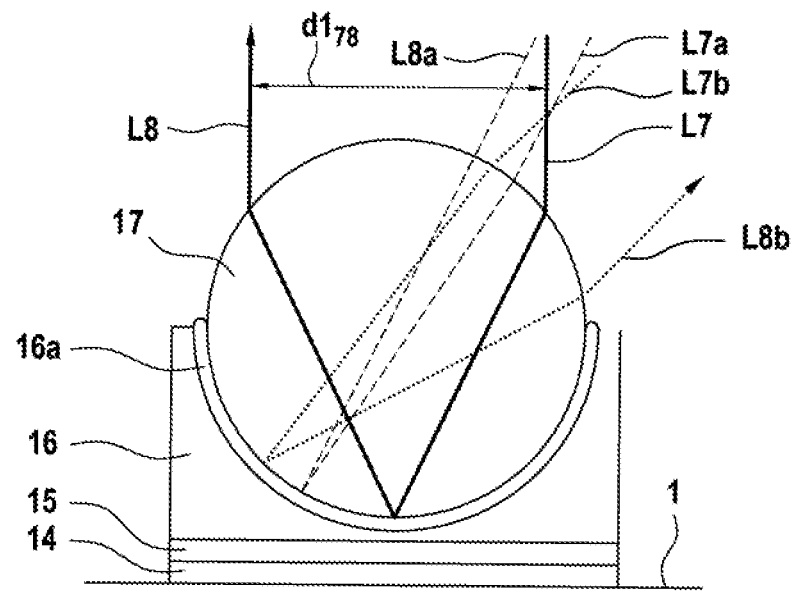
FIGS. 6a, 6b show schematic side views of a reflecting sphere (FIG. 6a) of the reflecting device of the display system illustrated in FIG. 5 and of a reflecting prism (FIG. 6b) of a reflecting device of the display system according to a further embodiment.

FIG. 6a shows a schematic side view of the embedded reflecting sphere 17 of the reflecting device 4 of the exemplary display system according to the invention, which sphere is illustrated in FIG. 5. Half of the reflecting sphere 17 is embedded in the embedding layer 16, wherein the reflecting layer 16a, which rests against the embedded outer side of the reflecting sphere 17, is arranged between an embedded outer side of the reflecting sphere 17 and the embedding layer 16. The layer 16 with the cutout for the reflecting sphere 17 is arranged on the substrate layer 15, which in turn is applied to the adhesive layer 14 for an assembly on the instrument panel 1.

The beam L7 incident on the reflecting sphere 17 is reflected in the reverse direction as beam L8 emerging from the reflecting sphere 17, with a spacing $d1_{78}$ being present between the beams L7 and L8. The spacing $d1_{78}$ is only reduced to zero in the case where the beam L7 impinging on the reflecting sphere 17 passes through a center of the reflecting sphere 17. Smaller distances between entering and emergent beams can be identified in the beam paths with incident beam L7a and emergent beam L8a and incident beam L7b and emergent beam L8b. The beam L7a and L7b impinging on the reflecting sphere 17 is incident at an angle with respect to the normal vector N of the reflecting device 4 in the form of the reflection film, which angle deviates significantly from perpendicular incidence. Thus, the incident beam angle can by all means be 25 degrees with respect to the normal vector, and so the projection device 5, 6 can be positioned with incident beam angles of up to 25 degrees with respect to the normal vector of the reflecting device 4.

Figure 6B:
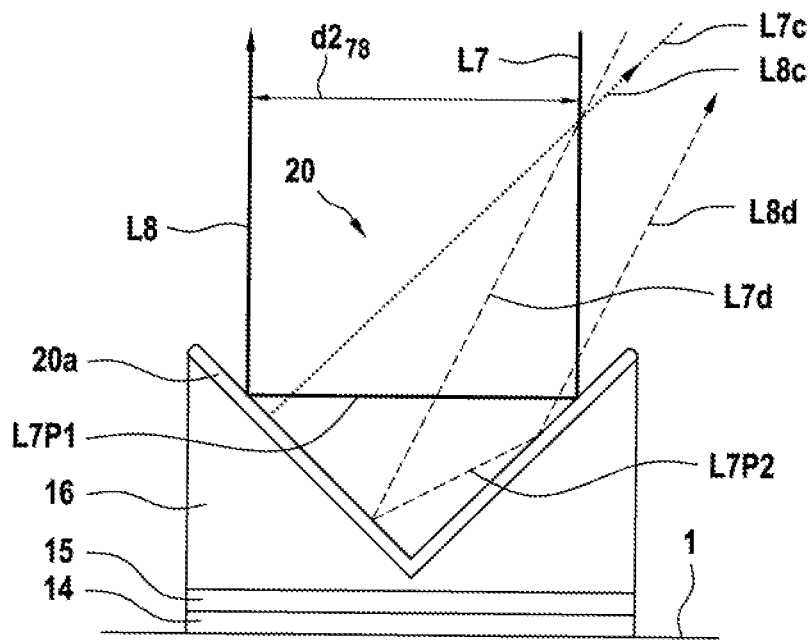

FIG. 6b shows a schematic side view of a reflecting prism 20 of the reflecting device 4 of the display system according to the invention in a further embodiment. Once again, a reflecting layer 20a has been applied to the embedding layer 16, wherein the embedding layer 16 is arranged on the substrate layer 15 which is arranged on the adhesive layer 14 for assembly on the instrument panel 1. The reflecting prism 20 is formed in the side view by two sides of the reflecting layer 20a, which are arranged substantially perpendicular to one another such that the partial beam L7 radiated on the prism is reflected as partial beam L8, wherein there is a spacing $d2_{78}$ between the partial beams L7, L8, which distance becomes ever larger, the further away the incoming partial beam L7 is radiated in from an edge formed by the mutually perpendicular sides of the reflecting layer 20a. Partial beams L7c and L7d, radiated in at an angle not equal to zero, are reflected as emitted partial beams L8c and L8d. Here, the incoming partial beam L7c is retroreflected without a spacing to form the emitted partial beam L8c in the case of perpendicular incidence on one of the two sides of the reflecting layer 20a.

In the case of narrower angles with respect to the normal vector N of the reflecting device 4, a beam path arises, in which light in the form of the partial beam L7d, radiated on the one side of the reflecting layer 20a of the prism, is reflected in the form of the partial beam L7P2, which is then reflected on the other side of the reflecting layer 20a than the emergent partial beam L8d. In this case, a spacing between the incident partial beam L7d and the emergent partial beam L8d is smaller than in the case of incoming radiation parallel to the normal vector N as per the incident beam L7, in which the spacing $d2_{78}$ between incident partial beam L7 and emergent partial beam L8 exactly corresponds to a length of the partial beam L7P1, which is reflected from one side of the reflecting layer 20a to the other side of the reflecting layer 20a before it emerges from the prism 20 as partial beam L8. In a three-dimensional visualization, i.e., in a plan view, the prism 20 would be formed by three plane reflecting regions of the reflecting layer 20a.

The features of the invention described with reference to the illustrated embodiments, for example the use of the prisms 20 in the reflecting device 4 in the embodiment shown in FIG. 6b, can also be present in other embodiments of the invention, for example the use of reflecting spheres 17 as per the embodiment shown in FIGS. 5 and 6a, unless anything else is specified or this is inherently impossible for technical reasons.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display system of a vehicle for displaying a virtual image, comprising:
    a projection device which is configured to emit display light in order to generate an image;
    a reflecting device, which is configured for a first reflection of display light of the projection device arranged above the reflecting device by way of the reflecting device attached in or on an instrument panel of the vehicle, wherein the display light of the projection device incident on the reflecting device is substantially retroreflected; and
    a windshield of the vehicle, which windshield is configured for a second reflection of at least part of the display light, which was reflected by the reflecting device, to eyes of an observer in the vehicle in order to allow the observer to see, behind the windshield, the virtual image of the image generated by the projection device, wherein
    the projection device is arranged relative to a substantially plane reflecting surface of the reflecting device such that the display light of the projection device incident on the reflecting surface is incident on the reflecting surface in a manner substantially parallel to a normal vector of the reflecting surface.

2. The display system according to claim 1, wherein the projection device arranged above the reflecting device is arranged on the vehicle outside of an interior of the vehicle for the observer and beyond the windshield of the vehicle.

3. The display system according to claim 2, wherein the display is arranged on or in a roof of the vehicle or on an outer side of the windshield.

4. The display system according to claim 2, wherein an optical axis of the projection device extends substantially parallel to a normal vector of the substantially plane surface of the reflecting device.

5. The display system according to claim 1, wherein a partial beam of the display light reflected by the reflecting device has, up to an angle of no more than 20 degrees, with respect to a partial beam of the display light of the projection device incident on the reflecting device, an intensity which allows the observer to see, behind the windshield, the virtual image of the image generated by the projection device.

6. The display system according to claim 5, wherein the projection device arranged above the reflecting device is arranged in an interior of the vehicle and substantially level with the eyes of the observer.

7. The display system according to claim 6, wherein the projection device is arranged on or in either a headrest or an upper part of a seat of the vehicle.

8. The display system according to claim 1, wherein a partial beam of the display light reflected by the reflecting device has, up to an angle of no more than 15 degrees, with respect to a partial beam of the display light of the projection device incident on the reflecting device, an intensity which allows the observer to see, behind the windshield, the virtual image of the image generated by the projection device.

9. The display system according to claim 1, wherein a partial beam of the display light reflected by the reflecting device has, up to an angle of no more than 10 degrees, with respect to a partial beam of the display light of the projection device incident on the reflecting device, an intensity which allows the observer to see, behind the windshield, the virtual image of the image generated by the projection device.

10. The display system according to claim 1, wherein the reflecting device is formed from a substantially retroreflective film.

11. The display system according to claim 10, wherein the film is a high gain retroreflective film.

12. The display system according to claim 1, further comprising:
    a camera arranged in or on the instrument panel of the vehicle and/or on the windshield of the vehicle is aligned with the observer or the windshield such that a position of the eyes of the observer are determinable by the camera during operation of the camera; and
    a closed-loop control unit configured to interact with the camera and the projection device such that when there is a change in the position of the eyes of the observer the image generated by the projection device is altered in terms of its position relative to the eyes of the observer by a horizontal and/or vertical rotation of the projection device or of an actuator in the projection device in order to allow the observer to see, behind the windshield, the virtual image of the image generated by the projection device when the eye position has changed.

13. A method for displaying a virtual image for a vehicle, comprising:
    first reflecting of display light of a projection device arranged above a reflecting device by the reflecting device attached in or on an instrument panel of the vehicle, wherein the display light of the projection device incident on the reflecting device is substantially retroreflected; and
    second reflecting of at least some of the display light reflected by the reflecting device by a windshield of the vehicle to eyes of an observer in the vehicle in order to allow the observer to see, behind the windshield, the virtual image of an image generated by the projection device, wherein
    the projection device is arranged relative to a substantially plane reflecting surface of the reflecting device such that the display light of the projection device incident on the reflecting surface is incident on the reflecting surface in a manner substantially parallel to a normal vector of the reflecting surface.

14. The method according to claim 13, wherein the display light of the projection device incident on the reflecting device is substantially retroreflected such that the virtual image is visible to the observer when the projection device is arranged outside of a visual field of the observer in an interior of the vehicle.

* * * * *